(12) United States Patent
Kemp

(10) Patent No.: US 6,427,711 B1
(45) Date of Patent: Aug. 6, 2002

(54) INLINE CHECK VALVE

(75) Inventor: Willard E. Kemp, Houston, TX (US)

(73) Assignee: Kemp Development Corporation, Houston, TX (US)

( * ) Notice: Subject to any disclaimer, the term of this patent is extended or adjusted under 35 U.S.C. 154(b) by 0 days.

(21) Appl. No.: 09/693,265

(22) Filed: Oct. 20, 2000

Related U.S. Application Data
(60) Provisional application No. 60/162,878, filed on Nov. 2, 1999.

(51) Int. Cl.$^7$ .............................................. F16K 15/02
(52) U.S. Cl. .............................. 137/15.18; 137/315.33; 137/454.2; 137/543.15; 137/543.19; 251/360; 251/362; 251/364
(58) Field of Search ........................... 137/15.18, 15.19, 137/315.27, 315.33, 454.2, 540, 543, 543.15, 543.19; 251/360, 362, 364

(56) References Cited

U.S. PATENT DOCUMENTS

| | | | | |
|---|---|---|---|---|
| 3,063,467 A | * | 11/1962 | Roberts, Jr. et al. | 251/364 |
| 3,095,897 A | * | 7/1963 | Pennstrom | 251/364 |
| 3,471,123 A | * | 10/1969 | Carlson et al. | 251/362 |
| 3,995,658 A | * | 12/1976 | Hager | 137/543 |
| 4,911,196 A | * | 3/1990 | Kemp | 137/540 |
| 5,170,989 A | * | 12/1992 | Kemp | 251/174 |
| 5,435,337 A | | 7/1995 | Kemp | |
| 5,921,276 A | * | 7/1999 | Lam et al. | 137/543 |

OTHER PUBLICATIONS

War Chek brochure "The New Look in Check Valves" from Kemp Development Corporation, four sheets, published prior to 1995.

* cited by examiner

Primary Examiner—Michael Powell Buiz
Assistant Examiner—Ramesh Krishnamurthy
(74) Attorney, Agent, or Firm—Browning Bushman P.C.

(57) ABSTRACT

An inline check valve having a piston member and a seat in a valve body having a larger diameter at the end thereof away from the piston. The seat is retained within a groove by a seat retainer which prevents removal of the seat from the groove without deformation of the seat.

6 Claims, 4 Drawing Sheets

INLINE CHECK VALVE

REFERENCE TO RELATED APPLICATION

This application claims the benefit of provisional application Ser. No. 60/162,878 filed Nov. 2, 1999.

FIELD OF THE INVENTION

This invention is in the field of check valves which allow free flow of fluid in one direction and prevent flow in the opposite direction and is particularly suited to area ruled check valves in which the cross sectional area exposed to flow of fluid through its passage through the valve is unchanged so that resistance to flow is minimized.

BACKGROUND OF THE INVENTION

Check valves are commonly made in the swing check style where a disc or flapper is tilted to allow flow of fluids beneath the flapper in one direction, but the flapper swings shut tightly when flow is reversed. Such a prior art valve is shown schematically in FIG. 1. Because swing check valves often do not close quickly enough, or because the flow pattern through a swing check is not smooth, other styles are sometimes used. The inline check valve shown and described fully in U.S. Pat. No. 4,911,196 is an example of a valve that has superior flow and faster closing characteristics.

An inline or area ruled check valve generally has five principal components. Sometimes these components are made of several pieces, but the combined intent is the same. A body is the main component that holds together all other parts, fits against or between line flanges, and forms the basic conduit through which fluid flows. A piston is mounted within the valve body and is constrained to move only in a lateral direction. The piston moves under urging of the flow away from the seat and fluid flows smoothly through the valve body around the piston and out the downstream end of the valve. When flow is reversed the piston moves under urging of the fluid and also urged by the spring mechanism against the seat and stops all flow. A cage is usually installed to guide the piston in its movement between positions. A seat is usually installed near the upstream end of the valve where the piston will mate easily with it when the flow is reversed. A spring is installed between cage and piston to urge the piston toward the closed or reversed position.

SUMMARY OF THE INVENTION

This application is directed only to an inline type of check valve and is particularly directed to a superior method of making such a check valve.

DETAILED DESCRIPTION OF PREFERRED EMBODIMENTS

Figure 1:
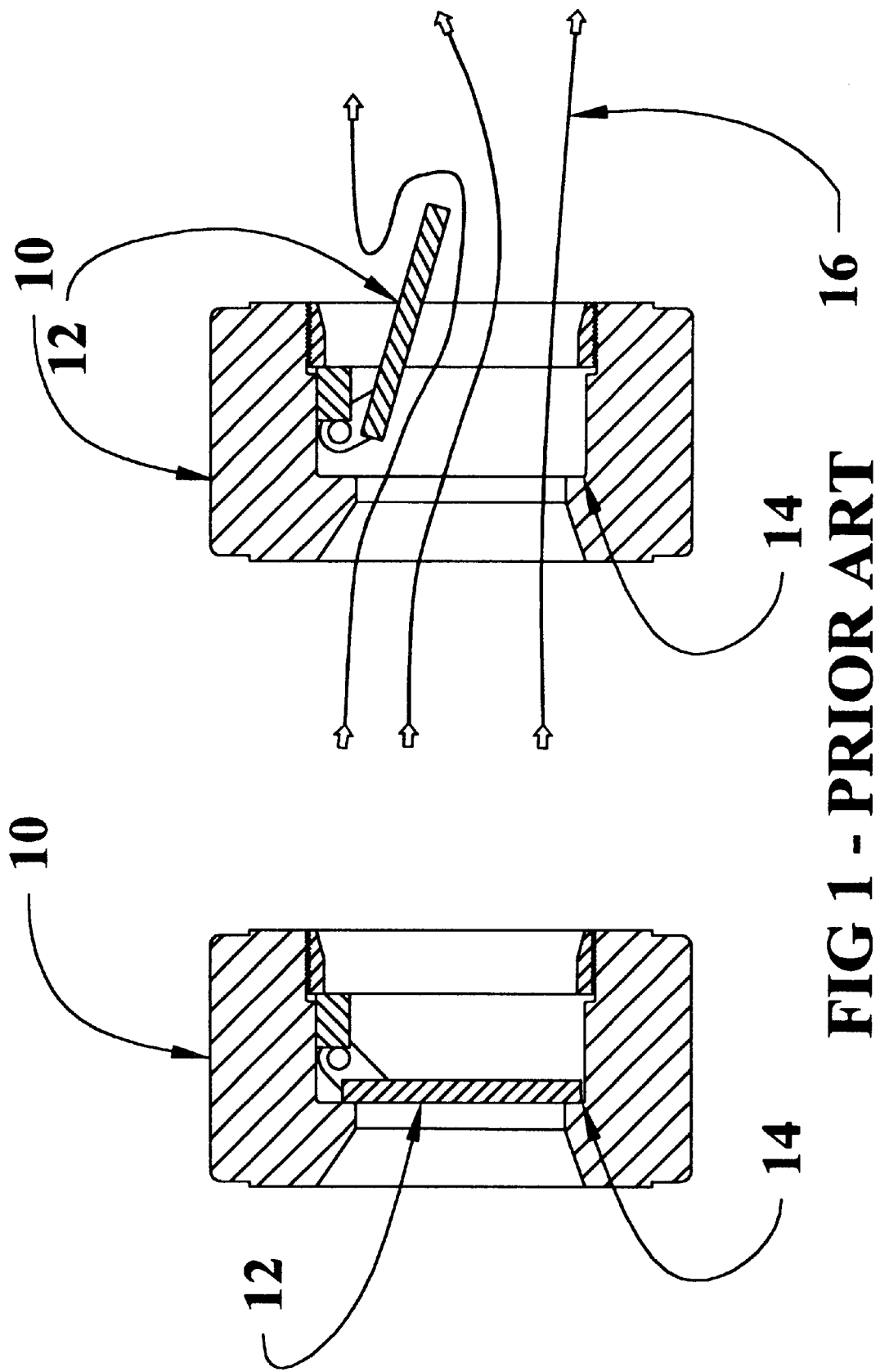
FIG. 1 is an orthographic view of a prior art swing type check valve.

Referring to the drawings, FIG. 1 shows a prior art check valve in the reverse flow or stopped position in the left view and in the normal flowing position in the right view. A swing check valve comprises body (10), swing check (12), and seat area (14) where the swing check (12) makes contact to stop flow. Flow lines (16) indicate the flow of fluid beneath the swing check.

Figure 2:
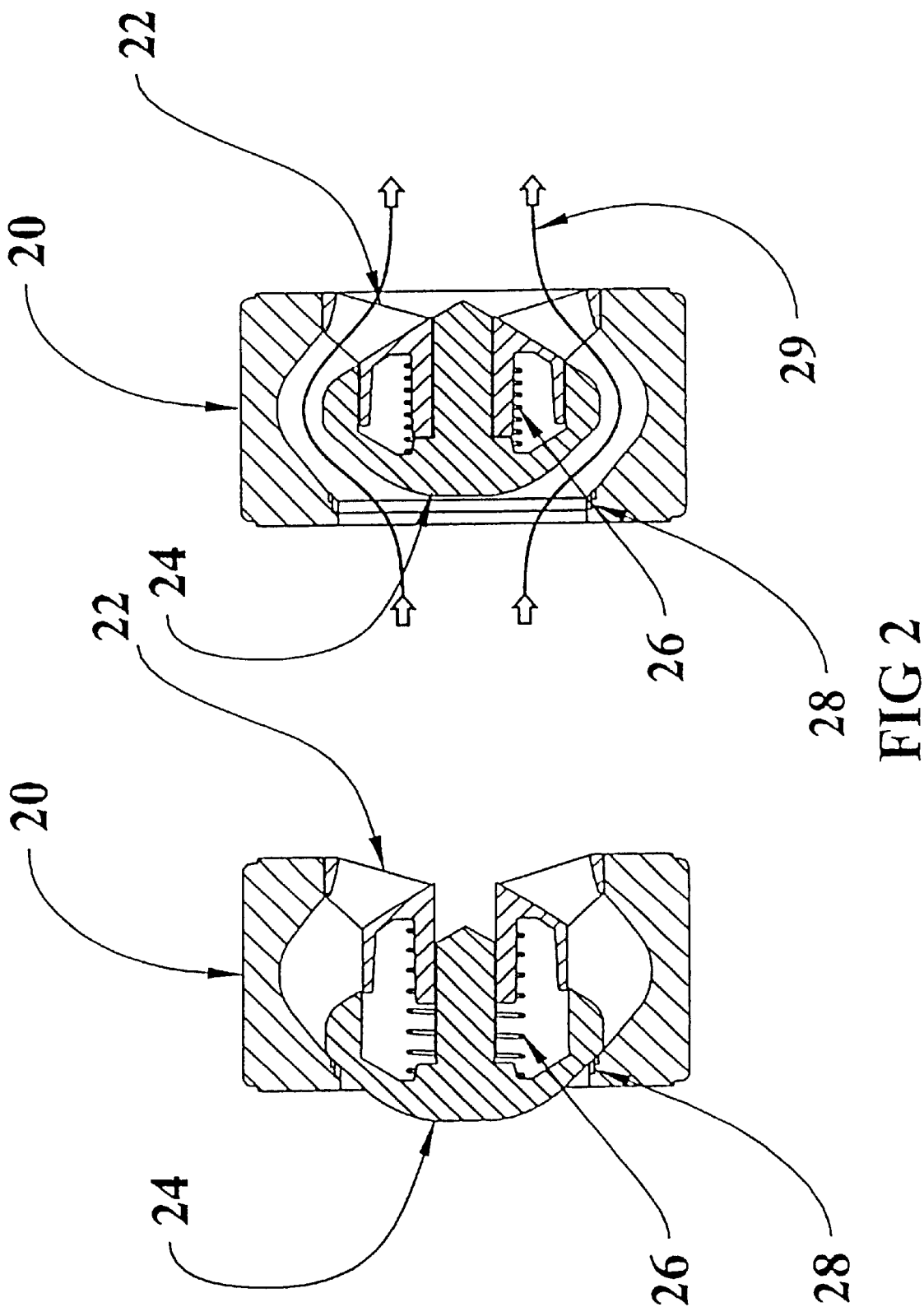
FIG. 2 is an orthographic view of the proposed inline check valve showing closed and open positions.

FIG. 2 shows an inline or area ruled check valve. The left view of FIG. 2 shows the valve in the stopped or reverse flow condition and the right view shows the normal flow condition. The inline check valve comprises a body (20) and a piston (24) which moves between open and closed positions. Spring (26) helps force the piston (24) into the closed position on the left side of FIG. 2 and contracts to allow the piston (24) to move to the normal flow position shown on the right side of FIG. 2. A seat (28) makes contact with the piston (24) when reversed flow condition occurs. Cage (22) guides the piston (24) between open and closed positions and serves to constrain the piston (24) from radial movement while allowing it to move freely in the longitudinal direction. Flow lines (29) indicate the generally smooth flow of fluid through an inline style valve.

Figure 3:
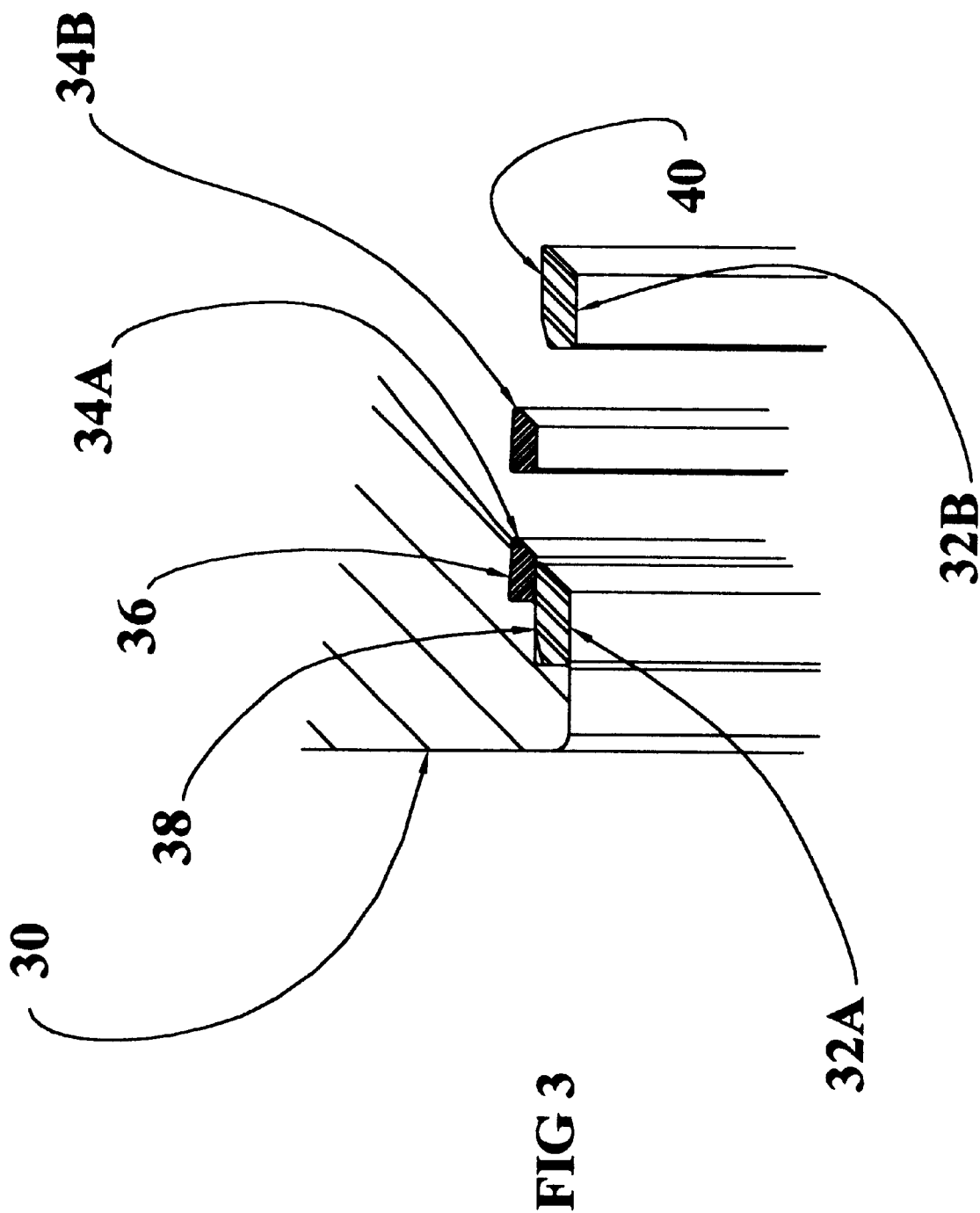
FIG. 3 is a detailed view showing a portion of the inline check valve seat.

Inline check valves generally require a seat installed at the upstream end upon which the piston member closes when flow is reversed. The manufacture of this seat is often difficult as a plastic sealing member must be trapped and held firmly in position. In my design the seat is in two pieces. Referring to FIG. 3, seat member (34a and 34b) is made of elastomeric material having a modulus of elasticity less than 1 million pounds per square inch per inch. This member is made with a reentrant design that can be installed only because of the low modulus of elasticity. Seat member (34b) is shown in the free position whereas seat (34a) is shown installed. The OD of seat member (34a) designated as (36) is larger at one end than the other and fits in a mating recess and can only be compressed into that recess because the seat is made of the relatively low modulus of elasticity material. The OD (40) of seat retainer (32b) is essentially uniform in diameter and fits in a recess (38) of uniform diameter in body (30). The diameters must be very close to each other because seat retainer (32a) and body (30) are made of relatively high modulus of elasticity materials which will not allow significant compression.

Seat retainer (32b) shows the seat retainer in the uninstalled position and seat retainer (32a) shows it as installed. The seat retainer (32b) is made from a material having a modulus of elasticity more than 10 million pounds per square inch per inch and often more than 25 million pounds per square inch per inch. The seat retainer (32b) is pressed into a mating recess (38) in the body (30) and will stay in place because of its high modulus of elasticity. Seat retainer (32b) has a generally uniform outside diameter as it can be compressed only very slightly as it is installed in body (30) because both have a very high modulus of elasticity. Once the seat retainer (32b) is in position (32a), seat member (34a) cannot move because of the reentrant nature of the design. The seat member (34a), while of low modulus material, is nevertheless essentially incompressible and cannot be removed until the seat retainer (32b) is first removed.

Another manufacturing difficulty is maintaining close clearances between mating parts that must slide relative to each other. Referring to FIG. 2, for instance, piston (24) slides relative to cage (22). Frequently the clearance between two such sliding parts is as little as 0.001 to 0.060 inches. Machining tolerances as close as +/-0.0005 inches as is necessary to maintain such close clearances is understandably difficult. Further there is the possibility of particles becoming lodged between the mating parts which can cause scoring and binding. An unusual method of maintaining a close clearance while also providing for a place where particles can be trapped without causing difficulties has been built into this inline check valve.

Figure 4:
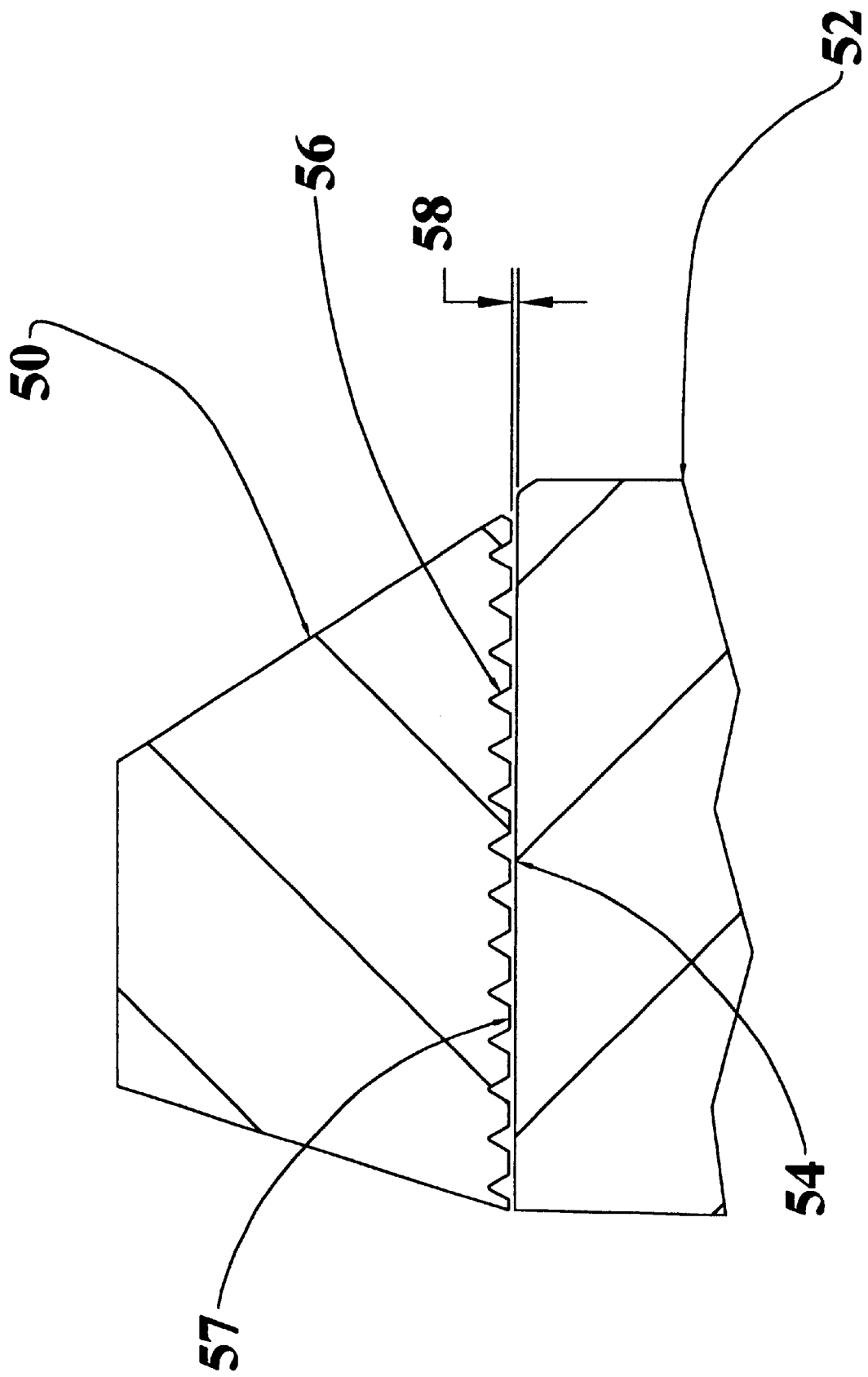
FIG. 4 is a portion of the inline check valve showing a preferred method for machining close-fitting, sliding surfaces.

Referring to FIG. 4, members (52) and (50) slide relative to each other. At least one of the surfaces is machined with a thread or series of grooves that is purposely made a few thousandths of an inch to as much as 20 thousandths of an inch oversized causing an interference. Then a second cut is made at the desired diameter by truncating the surfaces of the thread and maintaining clearance (58) between surfaces (57) and (54). Machining surface (56) is easier because the cut is intermittent and provides for automatic chip breakage. In addition the surface now has sizeable grooves to absorb particles which may be substantially larger than the actual clearance. If desired, both surfaces can be made as a series of grooves providing only that the grooves do not match each other so that clearance (58) can be maintained.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A check valve for connection in a flow line comprising:

a body having a flow passage therethrough;

a piston member mounted in said body for moving longitudinally between a normal flow position and a reverse flow position;

said body including a cage member mounting said piston for relative sliding movement between normal and reverse positions;

opposed mating surfaces defined between said cage member and said piston and having diameters with less than 0.060 inch diametral clearance; at least one of said mating surfaces being a truncated multiple groove surface of a predetermined diameter.

2. A check valve as defined in claim 1 wherein said truncated multiple groove surface comprises a threaded surface.

3. A method for forming mating diametral surfaces between a piston valve member of a check valve and a cage on which the piston valve member is mounted for relative sliding movement; said method comprising:

forming one of said mating surfaces of an oversize diameter;

providing a series of grooves in said oversized diameter in a first cut;

then truncating the outer surfaces of the grooves in a second cut to define a predetermined diameter so that a predetermined clearance is obtained between the mating diametral surfaces.

4. The method as defined in claim 3 including machining the truncated surfaces of said grooves after said second cut.

5. The method as defined in claim 4 wherein the step of providing a series of grooves in said one mating surface includes providing a threaded surface on said one mating surface.

6. A check valve for connection in a flow line comprising:

a body having a flow passage therethrough;

a piston member mounted in said body for moving longitudinally between a normal flow position permitting fluid flow through said flow passage and a reverse flow position blocking fluid flow through said flow passage, said body including a cage member to guide said piston between normal and reverse positions;

said body having an annular groove about said flow passage defining an inner shoulder and inner peripheral surface, and an adjacent outer shoulder and outer peripheral surface, said inner and outer peripheral surfaces being concentric to each other at any point measured parallel to the axis of said inner peripheral surface, said outer peripheral surface not being a constant diameter, said inner and outer shoulders being spaced axially from each other;

an annular seat fitting against said outer shoulder and outer peripheral surface and made of a material to allow it to be deformed during installation, said seat having an outer diameter away from said piston member greater than the diameter toward said piston member; and an annular seat retainer fitting against said inner shoulder and inner peripheral surface, said seat having a shape unchanged from its uninstalled shape while in a final retaining position and a shape which is deformed during installation of said seat; and said seat retained in installed position by said seat retainer so that said seat may not move out of said final installed position without being deformed, said seat projecting axially toward said piston member beyond said seat retainer for sealing against said piston valve member.

* * * * *